Patented June 20, 1967

3,326,992
POLYCYCLIC HYDROCARBON
COMPOSITION
Ernst W. Müller, St. Augustin, Germany, and Norman J. H. Small, Chester, England, assignors to Shell Oil Company, New York, N.Y., a corporation of Delaware
No Drawing. Filed June 4, 1965, Ser. No. 461,503
Claims priority, application Great Britain, Jan. 15, 1965, 1,892/65
1 Claim. (Cl. 260—666)

This invention relates to certain novel compositions comprising mixtures of polycyclic hydrocarbons, which mixtures have specified amounts of ethylenic unsaturation.

In co-pending U.S. application of Müller et al., Ser. No. 257,090, filed Feb. 8, 1963, now abandoned, certain mixtures of unsaturated bicyclo-(2.2.1)hepta-2,5-diene dimers and an improved process for the production thereof are disclosed and claimed. The dimer mixtures, as well as certain of the individual components, are characterized by low melting points and relatively high heats of combustion per unit weight per unit volume so that the mixtures are suitable for utilization as high energy fuels, particularly in low temperature applications where a weight and/or volume saving is of importance, for example, as fuels for jet aircraft. Although there exists the possibility of bicycloheptadiene dimers which are saturated, that is, dimers which do not contain ethylenic unsaturation, i.e., non-aromatic carbon-carbon double bonds, the dimer mixtures prepared by the process described in U.S. Ser. No. 257,090 comprise mixtures of dimers having a substantial degree of ethylenic unsaturation.

The presence of ethylenic unsaturation in the dimer molecules appears to contribute, at least in part, to certain of the desirable characteristics of the dimer mixture, for example, to a greater density and therefore to a higher heat of combustion per unit volume. However, advantages gained through utilization of dimer mixtures which are highly ethylenically unsaturated are somewhat compensated by the attendant disadvantages of reduced stability in storage, particularly thermal and light stability, and an even yet undesirably high melting point. Complete saturation of the unsaturated carbon-carbon linkages of such a dimer mixture results in greater stability for the completely saturated dimer composition, but complete saturation also results in a decreased dimer mixture density so that the desirable heat of combustion to volume ratio is also decreased. It would be of advantage to provide compositions comprising bicycloheptadiene dimers or derivatives thereof which retain many of the desirable characteristics of the highly unsaturated dimer mixtures and yet are characterized by increased stability and reduced melting point.

It is an object of the present invention to provide novel compositions comprising bicycloheptadiene dimers wherein specified percentages of the unsaturated moieties initially present in the dimer mixture have been modified into saturated carbon-carbon single linkage moities. An additional object is to provide novel compositions comprising partially-saturated bicycloheptadiene dimer mixtures possessing optimum amounts of ethylenic unsaturation.

It has now been found that these objects are accomplished by the provision of compositions comprising partially-saturated bicycloheptadiene dimer mixtures wherein from about 20% to about 80% of the ethylenic unsaturation normally present in a bicycloheptadiene dimer mixture is instead saturated. Such mixtures of partially saturated bicycloheptadiene dimers are characterized by melting points lower than either the corresponding completely saturated dimer mixture or the corresponding highly unsaturated dimer mixture and by an increased stability when compared with an analogous dimer mixture having more extensive ethylenic unsaturation.

The novel compositions of the present invention comprise partially-saturated bicycloheptadiene dimer mixtures. By the term "saturated" as employed herein is meant the effective result of conversion of carbon-carbon ethylenic unsaturation to carbon-carbon linkages which are not multiple. Thus, the term "partially-saturated bicycloheptadiene dimer mixture" refers to a mixture of components which are either derived from or correspond structurally to bicycloheptadiene dimers and differ from the highly unsaturated dimer mixture in the respect that a portion of the ethylenic linkages normally present in components of a bicycloheptadiene dimer mixture are, in contrast, carbon-carbon single linkages in the case of the partially-saturated dimer mixtures of the present invention.

In a preferred modification of the present invention, the novel compositions are prepared by partial hydrogenation of a bicycloheptadiene dimer mixture as by contacting an extensively unsaturated dimer mixture with molecular hydrogen in the presence of a hydrogenation catalyst. While it should be understood that the present invention is not to be limited to any particular method of preparing the dimer mixture employed as the starting material, a particularly suitable bicycloheptadiene dimer mixture is prepared according to the method of U.S. Ser. No. 257,090 whereby bicycloheptadiene is dimerized in the presence of certain Group VIII transition metal-olefinic compound complexes as catalyst. Alternatively, however, bicycloheptadiene is dimerized by other methods, as by the influence of light, and dimer mixtures produced thereby are also satisfactory.

When Group VIII transition metal-olefin complexes are employed as catalyst for bicycloheptadiene dimerization, the resulting dimer mixture consists essentially of bicycloheptadiene dimers having one of two general formulas. One type of component of typically encountered bicyclo heptadiene dimer comprises compound(s) represented by the systematic chemical name of pentacyclo-(8.2.1.1$^{4,7}$.0$^{2,9}$.0$^{3,8}$)tetradeca - 5,11 - diene. Such materials are represented by the structural formula

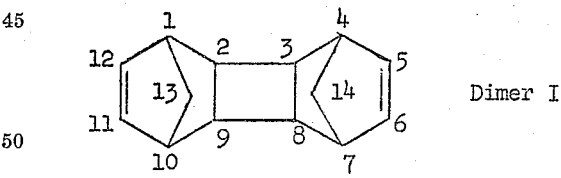

Dimer I wherein the added numerals indicate one conventional method of identifying the relative locations of the carbon atoms present. For convenience, dimers of this structure are herein identified by the terminology "Dimer I." It should be appreciated that the above structure of Dimer I is of necessity in two dimensions and that there exists the possibility of stereoisomers of the Dimer I formula, varying, for example, in cis-trans and/or endo-exo relationships. Although the precise stereochemical configurations are not known with certainty, three stereoisomers of the Dimer I formula are observed in a typical mixture of bicycloheptadiene dimers. For convenience, these isomers are herein designated as Dimer Ia, Dimer Ib, and Dimer Ic. These stereoisomeric forms of Dimer I are identified by physical characteristics in Table I below.

The second general type of bicycloheptadiene dimer typically observed in a typical diene dimer mixture is represented by the systematic chemical name of hexacyclo (6.3.1.1$^{3,13}$.1$^{7,10}$.0$^{2,4}$.0$^{6,11}$)tetradec-8-ene and is depicted by the structural formula

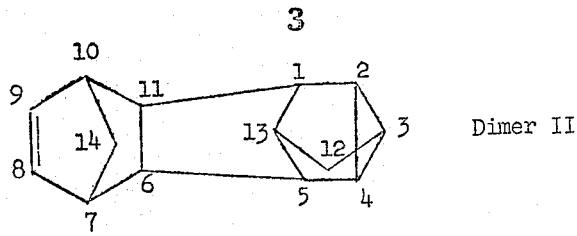

Dimer II wherein the added numerals indicate one conventional method of identifying the relative locations of the carbon atoms present, which isomer structure is herein for convenience termed Dimer II. Although it is apparent that the possibility of stereoisomerism also exists in the Dimer II molecule, the presence of Dimer II stereoisomers in a typical dimer mixture is not readily detected, there apparently being only one readily identified compound present of the Dimer II structure. The dimer referred to as Dimer II is identified by physical characteristics in Table I below.

TABLE I

| Dimer | Ia | Ib | Ic | II |
|---|---|---|---|---|
| Heat of Combustion, cal./ml | 12,330 | 11,062 | ~11,250 | 11,330 |
| Melting Point, °C | 68 | 94 | ~−25 | −20 |
| Boiling Point, °C/mm. Hg | 237/760 | 75/0.2 | 75/0.2 | 76/0.2 |
| Refractive Index | $1.5187_D^{70}$ | $1.516_D^{95}$ | | $1.5476_D^{20}$ |

The precise composition of a bicycloheptadiene dimer mixture will depend upon a number of factors, including the type of catalyst and the reaction temperature employed for the dimerization process. Alternatively, isolated individual bicycloheptadiene dimers are suitably mixed in proportions calculated to provide a dimer mixture of any desired composition. As it is desirable in high energy fuel applications to employ a dimer mixture of comparatively low melting point, the preferred compositions of the present invention or precursors thereof are those mixtures wherein major proportions of low-melting dimers or dimer derivatives are present. In the preferred modification of the present invention wherein the partially-saturated bicycloheptadiene dimer mixture is prepared by partial hydrogenation of a bicycloheptadiene dimer mixture, partially-saturated product compositions having preferred properties are obtained when the dimer mixture employed as starting material for a partial hydrogenation process contains a major proportion of Dimer II. Best results are obtained when a dimer mixture consisting essentially of dimers having the formulas of Dimer I and Dimer II is employed as starting material, wherein the molar percentage of Dimer II is at least 40% based on the dimer mixture. It is, however, desirable to have certain amounts of dimer of the Dimer I structure present, so that the preferred bicycloheptadiene dimer mixture to be partially hydrogenated to form the partially-saturated dimer mixture of the present invention has a molar percentage of Dimer II no greater than 80% on the same basis. Especially suitable as starting material are bicycloheptadiene dimer mixtures consisting essentially of dimers of the formulas Dimer I and Dimer II wherein the molar percentage of Dimer II is from about 50% to about 70%.

Partial hydrogenation of the reactant bicycloheptadiene dimer mixture is effected by conventional methods, as by contacting the dimer mixture with molecular hydrogen in the presence of a hydrogenation catalyst, e.g., transition metals such as nickel, palladium, rhodium and platinum, as well as metal oxide catalysts such as palladium oxide and copper chromite, which catalysts may be employed alone or supported on inert carriers such as carbon, alumina, barium sulfate, silica or the like. The hydrogenation is conducted in the liquid phase at moderate temperatures, e.g. from about 0° C. to about 100° C. and at a somewhat elevated hydrogen pressure, for example, from about 2 atmospheres to about 20 atmospheres. Hydrogenation is conducted in the absence of added solvent or in the presence of an inert solvent, particularly a hydrocarbon solvent such as benzene, toluene, cyclohexane, heptane or the like.

The extent of hydrogenation is controlled by observing the pressure decrease in the reaction system and terminating the hydrogenation when the desired extent of saturation has been reached, or alternatively by introducing an amount of hydrogen into the reaction system which is sufficient to saturate only a portion of the ethylenic unsaturation present in the reactant bicycloheptadiene dimer mixture. At the conclusion of the partial hydrogenation process, the reaction is terminated as by removing the catalyst, and any solvent present is removed as by distillation. The bottoms product comprises the desired partially-saturated dimer mixture which is suitably employed without further purification.

It will be appreciated that the resulting partially-saturated dimer mixture will comprise a number of components. As the bicycloheptadiene dimers of the Dimer I structure incorporate two ethylenic linkages it is not unexpected that the partially-saturated product will contain molecules having the Dimer I ring system wherein one of the two ethylenic linkages present has been saturated. Additionally, it is expected that there would be present molecules of the Dimer I ring structure wherein both ethylenic linkages have been saturated, that is, the product molecule per se is saturated with no ethylenic unsaturation present, as well as unreacted Dimer I molecules. The reactant bicycloheptadiene dimer molecules of the Dimer II ring structure incorporate only a single ethylenic linkage. Therefore, the resulting partially-saturated dimer product mixture will expectedly contain unreacted Dimer II molecules as well as molecules of the Dimer II ring structure wherein the ethylenic linkage has been saturated.

Methods for controlling the selectivity of the hydrogenation are not available so that it is not possible to obtain mixtures of specific product composition, it being considered probable that the partially-saturated dimer mixture comprises a mixture of all the possible saturated and partially unsaturated dimer derivatives, as well as unreacted bicycloheptadiene dimer molecules. The composition of the product mixture is variable but is influenced by the degree of saturation effected, and taken as a whole, the mixture is termed a "partially-saturated dimer mixture." In general, an increase in the extent of saturation results in an increase in stability, a highly desirable property as previously stated. The partial saturation process results in a lowering of the melting point of the product mixture, also desirable, provided that the extent of saturation is not too great, because as the extent of saturation approaches completion, the melting point of the product mixture, which initially decreased with the extent of hydrogenation, begins to increase so that the melting point of a highly saturated mixture is higher than the melting point of mixtures of a lower degree of saturation. It should be noted that it is also possible to effect an extent of hydrogenation greater than theoretical by "hydrocracking" the three-membered ring present in the Dimer II component of the reaction mixture, but under the conditions of the hydrogenation process of the present invention, such "hydrocracking" is not observed.

The preferred extent of saturation will therefore be determined upon the considerations that high stability results from high degrees of saturation, but that too high a degree of saturation results in an undesirable increase in the melting point of the partially-saturated dimer product. In terms of the preferred modification of the invention employing bicycloheptadiene dimer mixture consisting essentially of Dimer I and Dimer II wherein the molar percentage of Dimer II is at least 40% but no more than 80%, desirable product properties are obtained when from about 20% to about 85% of the total ethylenic linkages initially present in the dimer mixture have been saturated. More preferred, however, are the partially-saturated product mixtures resulting from saturation of from about 40% to about 75% of the total ethylenic linkages.

Expressed in other terms, the degree of hydrogenation is suitably measured as a function of the average number of ethylenic linkages per molecule present in the product mixture. It is evident, of course, that the complex bridged structure of either Dimer I or Dimer II precludes the formation of double bond isomers of either structure during hydrogenation so that only these dimers or at least partially saturated derivatives thereof are present in the product mixture. A reactant mixture consisting of 40% Dimer II, containing one ethylenic linkage, and thus essentially 60% Dimer I, containing two ethylenic linkages, when considered as a whole, contains an average of 1.6 ethylenic linkages per molecule. Alternatively, a reactant mixture consisting of 80% Dimer II and therefore essentially 20% of Dimer I, contains an average of 1.2 ethylenic linkages per molecule. When a dimer mixture is partially saturated, the average number of ethylenic linkages per molecule will be decreased, the precise resultant average depending upon the extent of saturation. Preferred partially-saturated dimer mixtures consist essentially of from 40 molar percent to 80 molar percent of $C_{14}$-hydrocarbons of the $$hexacyclo(6.3.1.1^{3,13}.1^{7,10}.0^{2,4}.0^{6,11})$$

ring system (Dimer II and its saturated derivative) and $C_{14}$-hydrocarbons of the pentacyclo($8.2.1.1^{4,7}.0^{2,9}.0^{3,8}$) ring system (Dimer I and its at least partially saturated derivatives) wherein the mixture contains an average of from 0.96 ethylenic linkage to 0.24 ethylenic linkage per molecule, more preferably an average of from about 0.72 ethylenic linkage to about 0.30 ethylenic linkage per molecule.

The partially-saturated dimer mixtures of the above compositions are characterized by increased stability when compared with bicycloheptadiene dimer mixtures, and by a more desirable melting point than either the bicycloheptadiene dimer mixture or the completely saturated derivative thereof. As previously stated, the partially-saturated compositions are well suited for utilization in high energy fuel applications.

To further illustrate the partially-saturated bicycloheptadiene dimer compositions of the invention, the following examples are provided. It should be understood that the details thereof are not to be regarded as limitations, as they may be varied as will be understood by one skilled in this art.

Examples I and II

A series of similar experiments was conducted employing mixtures of isomeric bicycloheptadiene dimers. A mixture of 100 g. of dimers and 50 g. of cyclohexane was placed in a suitable reactor with 2 g. of Raney nickel. Hydrogen, introduced into the stirred reaction mixture at a rate of about 20 1/hr. at atmospheric pressure and ambient temperature, was immediately absorbed. The reaction mixture was warmed to a temperature of about 40° C. After the calculated amount of hydrogen had been introduced, the catalyst was removed by filtration and the cyclohexane removed by distillation. The melting point of the resulting partially-saturated dimer mixture was determined as a function of the percentage of saturation. The results obtained are set out in Table II which includes, for purposes of comparison, melting points obtained for product mixtures with hydrogenation levels outside the desirable limits of the present invention.

TABLE II

|  | Example | |
| --- | --- | --- |
|  | I | II |
| Composition of starting material, percent: | | |
| Dimer Ia | 29.2 | 13.5 |
| Dimer Ib and Ic | 22.4 | 27.3 |
| Dimer II | 48.4 | 59.2 |
| Hydrogenation Product Yield, percent | 100 | 100 |

| Saturation of ethylenic linkages, percent | Melting point, °C. | Saturation of ethylenic linkages, percent | Melting point, °C. |
| --- | --- | --- | --- |
| 0 | −15 | 0 | −35 |
| 26.3 | −36 | 28.3 | −52 |
| 52.7 | −43 | 57 | −60 |
| 79 | −26 | 85 | −49 |
| 132 | −19 | 142 | −34 |

Examples III–IX

The storage stability of partially-saturated bicycloheptadiene dimers was determined by placing various mixtures in an open vessel maintained at 100° C. At various time intervals the percentage of light transmission (500 m$\mu$) through a 4 cm. cell containing the test solution was determined, and any tendency to form solid material at the liquid-air interface was determined by visual inspection. The results are shown in Table III, along with, for

TABLE III

|  | EXAMPLE | | | | | | |
| --- | --- | --- | --- | --- | --- | --- | --- |
|  | III | IV | V | VI | VII | VIII | IX |
| Composition of starting material, percent: | | | | | | | |
| Dimer Ia | 15 | 15 | 25 | 24 | 25 | 15 | 25 |
| Dimer Ib and Ic | 21 | 21 | 26 | 26 | 26 | 21 | 26 |
| Dimer II | 64 | 64 | 49 | 49 | 49 | 64 | 49 |
| Percentage hydrogenation | 25 | 50 | 62.5 | 77.7 | 0 | 15 | 100 |
| Light transmission, percent, after— | | | | | | | |
| 25 hours | 100 | 100 | 100 | 100 | 79.5 | 92.5 | 100 |
| 51 hours | 85.9 | 100 | 88.3 | 100 | 68.2 | 79.2 | 100 |
| 124 hours | 55 | 84 | 83.9 | 85.7 | 27.3 | 56.1 | 96.0 |
| Resinous solid (+) or no solid (−) at interface after— | | | | | | | |
| 24 hours | (−) | (−) | (−) | (−) | (+) | (+) | (−) |
| 51 hours | (+) | (−) | (−) | (−) | (+) | (+) | (−) |
| 124 hours | (+) | (−) | (−) | (−) | (+) | (+) | (−) | comparison, similar results for mixtures having hydrogenation levels outside the desirable limits of the present invention.

We claim as our invention:

The partially-saturated bicycloheptadiene dimer mixture obtained by hydrogenating from 40% to about 75% of the ethylenic unsaturation of a bicycloheptadiene dimer mixture which consists essentially of pentacyclo(8.2.1. $1^{4,7}.0^{2,9}.0^{3,8}$)tetradeca - 5,11 - diene and hexacyclo(6.3.1. $1^{3,13}.1^{7,10}.0^{2,4}.0^{6,11}$)tetradec-8-ene wherein the molar percentage of said hexacyclo compound is from about 50% to about 70% based on the bicycloheptadiene dimer mixture.

References Cited

FOREIGN PATENTS 626,407  6/1963  Belgium.

OTHER REFERENCES

Bird et al.: (I) Chemistry and Industry, pp. 20–21, 1960.

Bird et al.: (II) Tetrahedron Letters No. 11, page 373, 1961.

DELBERT E. GANTZ, *Primary Examiner.*

V. O'KEEFE, *Assistant Examiner.*